Sept. 1, 1970      H. P. ASHTON ET AL      3,526,334

DEVICE FOR STORING AND SERVING FOODSTUFFS

Filed Aug. 12, 1968      3 Sheets-Sheet 1

INVENTORS.
HAROLD P. ASHTON
JAMES B. SWETT
BY
Paul R. Wylie
ATTORNEY

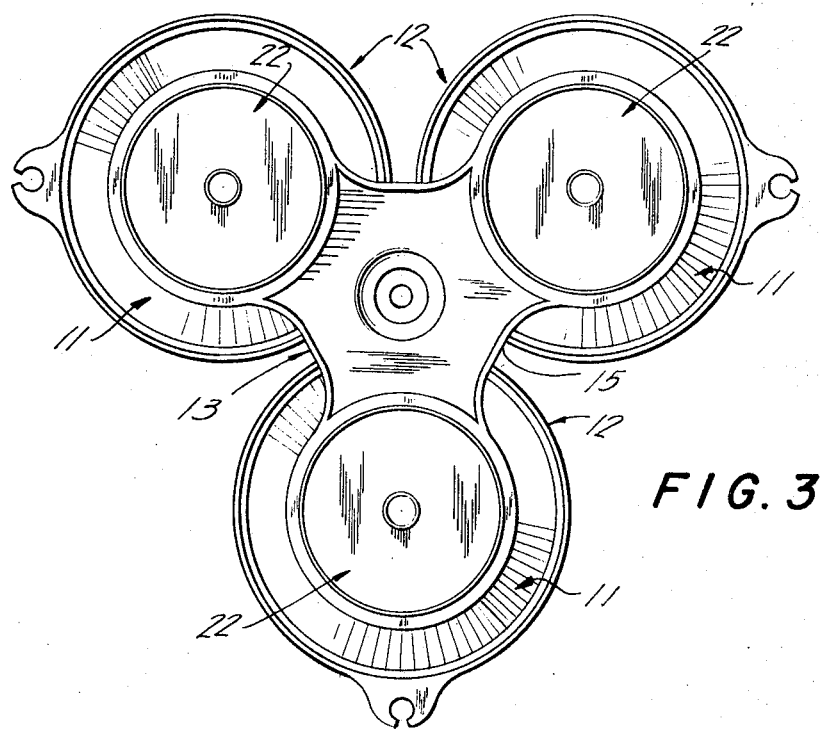
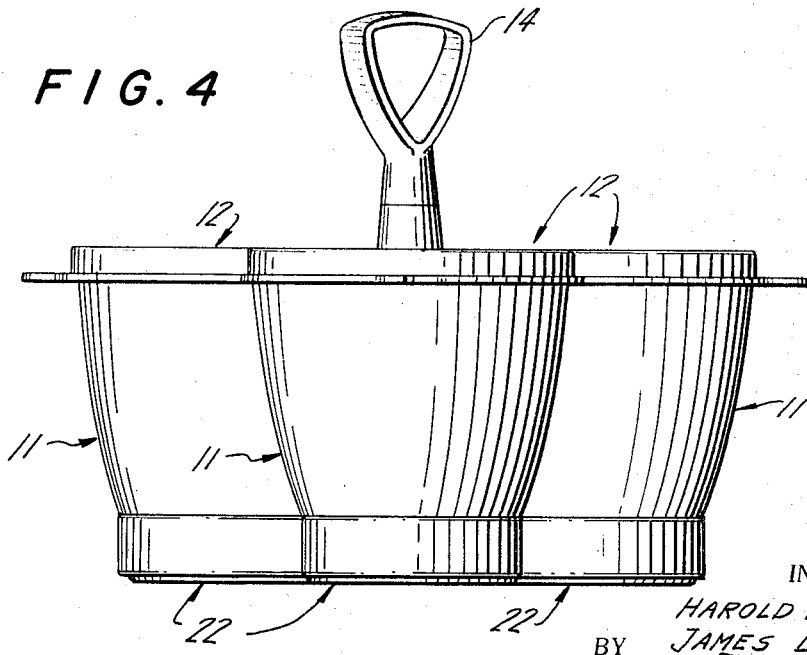

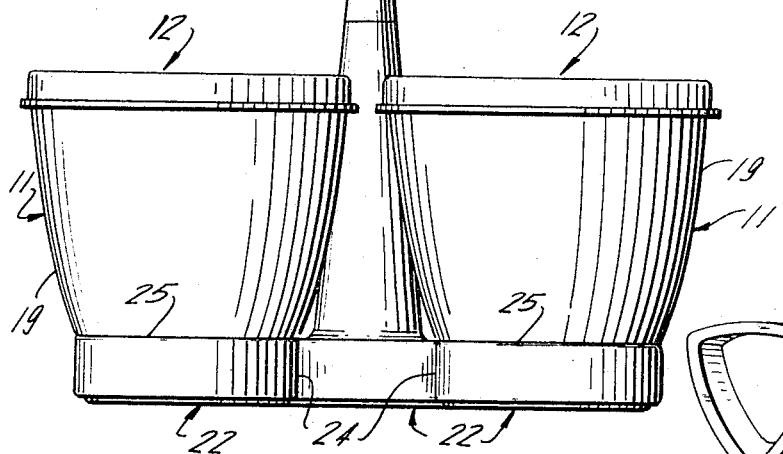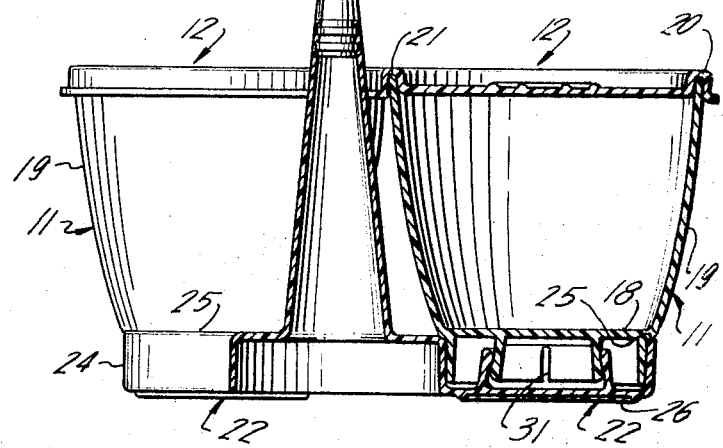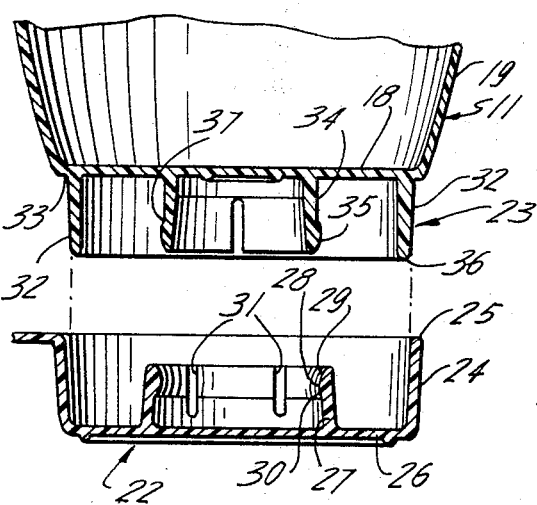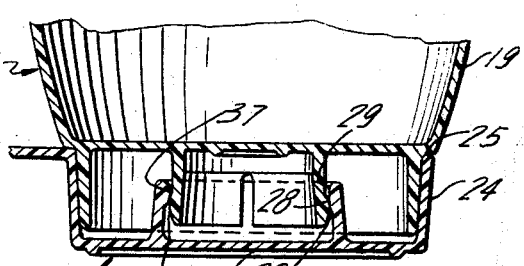

United States Patent Office 3,526,334
Patented Sept. 1, 1970

3,526,334
DEVICE FOR STORING AND SERVING FOODSTUFFS
Harold P. Ashton, Providence, and James B. Swett, Barrington, R.I., assignors to Dart Industries Inc., Los Angeles, Calif., a corporation of Delaware
Filed Aug. 12, 1968, Ser. No. 751,989
Int. Cl. A47g *23/02;* B65d *21/02*
U.S. Cl. 220—23.83
4 Claims

ABSTRACT OF THE DISCLOSURE

A device having a plurality of containers and a handle member supporting them from the bottom. The individual containers are capable of being sealed to permit the device to be stored in a refrigerator without loss of moisture from the contents. The containers are removable so that they can be individually stored in a refrigerator without the handle member. A connecting coupling arrangement is provided between the containers and the ends of the arm on the handle member whereby the containers can be demountably interfitted in such a manner that the contour of the outside wall of the container and the outside of the arms is tightly fitted and the joint between the two parts is minimized.

---

This invention relates generally to a device having individual containers for storing and serving foodstuffs such as condiments and the like. More specifically, the invention relates to such a device fabricated from plastic materials, and having a plurality of individual containers that can be demountably interfitted with a handle member. A specific aspect of the invention relates to a unique coupling arrangement between the containers and the base of the carrier member whereby the outside edges on the container and the base member are tightly fitted along a mutual joint.

Although there have been many containers adapted to be utilized with a serving and carrier device, few such containers and devices have been fabricated entirely from plastic materials. By far the large majority of such containers are of metal and glass or combinations of metal, glass and plastic. Of course, it has always been highly desirable to fabricate these devices entirely from plastic materials. The problems have included the difficulty in eliminating the appearance of poor quality workmanship in such an article. Thus, a container having two or more demountable pieces designed to appear as a continuous part would heretofore usually be expected to reveal a wide joint between the pieces. According to a specific aspect of this invention, that problem has now been overcome and accordingly it is now possible to produce a joint which will in all cases be tightly fit.

According to another aspect of the invention a unique functional design has been developed, whereby individual containers are supported at the lower extremities thereof by arms extending from a bottom portion of a handle of a serving and carrying member.

It was an object of this invention to provide a container that would be easily handled and would be adapted for both serving and refrigerator storage of foodstuffs.

Another object of the invention was to provide a container having a plurality of individual containers adapted for serving and storage of foodstuffs.

Another object of the invention was a provision of a joint adapted to serve as a coupling between two plastic articles to urge the same together in demountably interfitted relationship.

Further objects of the present invention will be apparent from the following description, reference being had to the accompanying drawings, wherein a preferred embodiment of the invention is shown.

In the drawings:

FIG. 3 is a bottom view of the device shown in FIG. 1;

FIG. 4 is a front elevation view of the device shown in FIG. 1;

FIG. 5 is an elevation view similar to the view in FIG. 4 with the device turned on its central axis 60°;

FIG. 6 is a view and cross-section taken on line 6—6 of FIG. 2;

FIG. 7 is an exploded cross-sectional view showing the relationship between a plug member on the lower portion of the container and a socket member on the end of an arm of a carrying device in an unassembled relationship; and, FIG. 8 is a view similar to FIG. 7 showing the plug and socket members in assembled relationship.

Figure 1:
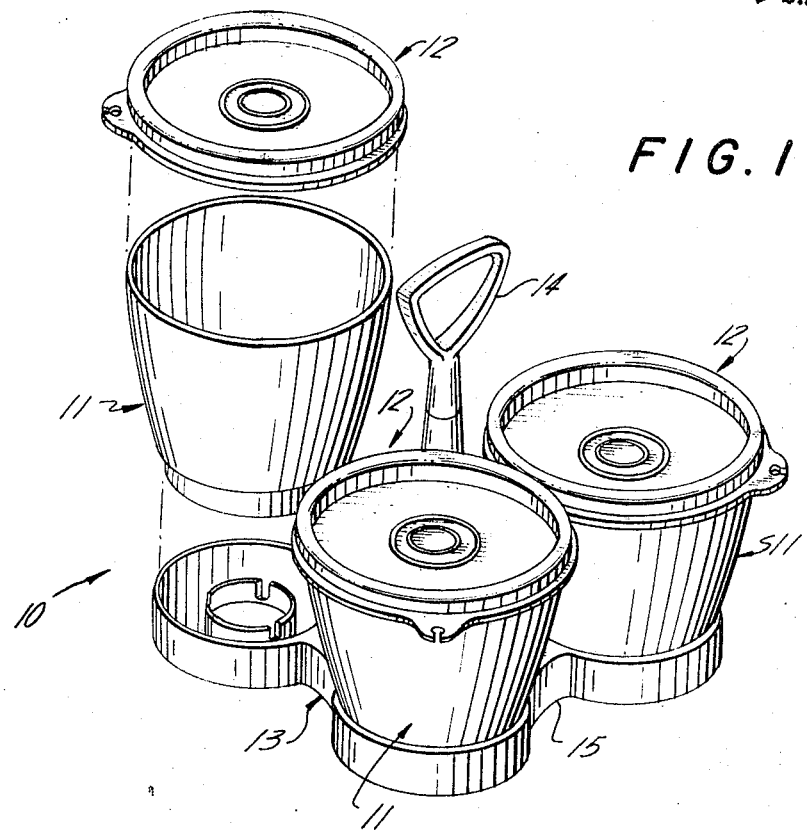
FIG. 1 is a view in perspective of a device for storing and serving foodstuffs according to the invention showing one of the individual containers thereof in exploded position with the container removed from the base of the carrying member and the cover removed from the upper portion of the container.
Figure 2:
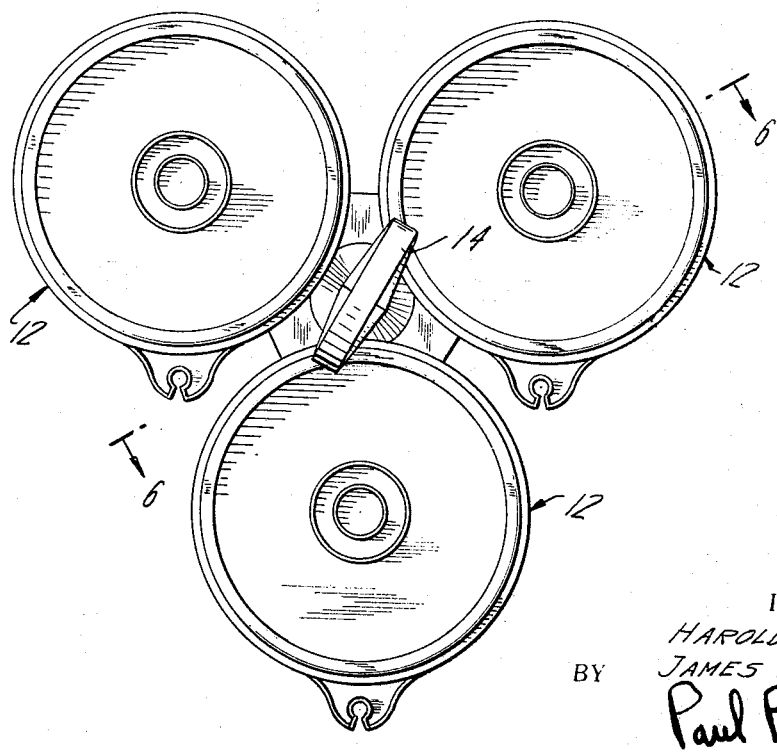
FIG. 2 is a top view of the device shown in FIG. 1.

Referring now to the drawings, there is provided according to the invention, a device 10 for storing and serving foodstuffs or the like. The device includes container 11 formed as individual cup members having covers 12, and a carrying and serving member 13. The carrying and serving member has a finger gripable handle 14 and container support arms 15 disposed about the base of said handle. The support arms extend outwardly with their axes lying on a single plane that is perpendicular to the longitudinal axis of handle 14. As seen in FIG. 6, handle 14 can be formed with an upper finger gripable portion 16 and a lower extending column 17 which is connected with arms 15.

The individual containers are formed as individual cup members having bottom 18 sidewalls 19 and closure 12. The sidewalls terminate in a peripheral flange 20. Closure 12 has a peripheral edge portion 21 formed as a U-shaped groove that is adapted to form a moisture tight seal with flange 20.

In the preferred embodiment of the invention, container 12 can be removed from carrying and serving member 13 for refrigerator storage. There is accordingly provided, a coupling between container 12 and carrying and serving member 13 which is designed to permit the containers 12 to be mounted on the carrying and serving member in demountable interfitted relationship.

As best seen in FIGS. 6, 7, and 8, the connecting coupling arrangement between container 12 and the end portion of arm 15 includes a socket portion shown generally at 22 and a plug portion shown generally at 23. The socket portion includes an outer wall 24 that terminates in an edge 25. Base portion 26 is connected to the opposite end of the outer wall of the socket member. A continuous inner wall portion 27 is located centrally of said base portion. The upper edge interiorly of the inner wall portion is provided with a smoothly rounded bead 28 having an upward inwardly inclined surface 29 and a lower outwardly inclined surface 30. Elongate slots 31 extend from the upper edge of the inner wall to a point adjacent base portion 26. The elongate slot extends generally substantially parallel to the perpendicular axis of said base portion.

Plug portion 23 has an outer wall 32 with an outside diameter less than the inside diameter of the outer wall 24 of said socket member. The length from the base of outer wall 32 is substantially less than the length from the base of outer wall 24. Shoulder portion 33 extends outwardly from the outer wall 32 of said plug portion. In the embodiment shown, shoulder portion 33 is substantially the same width as the upper edge 25 of wall portion 24 of the socket member 22. Plug member 23 has an inner wall 34. The inner wall slants outwardly, and has a bead 35 having an inwardly slanted upper edge 36 and an inwardly slanted lower edge 37.

The outside diameter of bead 35 is larger than the inside diameter of bead 28. Moreover, inclined surface 37 of bead 35 is of a greater diameter than inclined surface 30 of bead 28. Accordingly, when the plug 23 is inserted into socket 22, the slots of inner wall 34 and inner wall 27 respectively close and open to permit bead 35 to pass bead 28. Thereupon, the plug and socket member are joined in a demountable interfitted relationship such as shown in FIG. 8, with the inclined surface 30 and inclined surface 37 in mating relationship. Due to the force exerted by the differences in the normal diameters at that point, plugs 23 is continuously urged downwardly into socket 22. Shoulder 33 is seated firmly on the upper edge 25 of the outer wall 24 of socket 22. Moreover, the joint between outer wall 24 and container wall 19 of container 11 is reduced to the miinmum extent possible due to the constant pressure maintained by the foregoing described interfitting of socket 22 and plug 23.

With the foregoing described structure of the socket and the plug, the containers 11 can easily be removed by simply applying a twisting and lifting motion.

The structure as described, can be formed from a variety of materials by the usual injection molding processes and materials. For example, the cup shaped container members 11 and carrying and serving member 13 can be formed entirely of either linear polyethylene or polypropylene. To enhance sealing characteristics, it is preferred to have container closures 12 formed of low density polyethylene.

Among the advantages of the invention are the fact that the diameter of outer walls 32 of a plug portion 23 of container member 11 are of sufficient width to maintain the container in stable resting support when it is separated from carrying and serving member 13 and placed in a refrigerator or other storage compartment.

As seen in FIG. 3, the overall outline of the preferred configuration of the container provides a broad base whereby the container can be maintained in stable resting position on a tubular surface. The individual containers are also sufficiently close to the axis of handle member 14 so that serious instability due to a greater weight in two or more of the containers will not result in imbalance when the containers are carried by the handle.

The foregoing describes a specific embodiment of the invention, the scope of which is set out in the following claims.

We claim:

1. A device for storing and serving foodstuffs such as condiments and the like, said device being fabricated from plastic materials and comprising a handle member having a base about which a plurality of outwardly extending container support arm members are disposed in a manner adapted to demountably receive individual container members having bottom walls and side walls terminating in a peripheral flange, and wherein a coupling is provided between said support arm members and said container members comprising a socket portion on one of said members and a plug portion on the other of said members, said socket portions comprising an outer wall terminating in a peripheral edge, a base portion connected to the opposite edge of said outer wall, a continuous inner wall portion located centrally of said base portion, portions of said inner wall portion being inclined toward the perpendicular axis of said base, the upper edge of said continuous inner wall terminating below the plane defined by the upper edge of said outer wall, said inner wall having at least one elongated slot breaking the continuous upper edge surface and extending generally parallel to the perpendicular axis of said base portion; said plug portion having an outer wall with an outside diameter less than the inside diameter of the outer wall of said socket portion, and a height less than the height of said outer wall of said socket portion; a shoulder portion extending outwardly from the outer wall of said plug portion, a base portion connected to the outer wall of said plug portion adjacent said shoulder portion, a continuous inner wall portion located centrally of said base portion and having at least one elongate slot extending from the upper edge thereof to a point adjacent said base, portions of said inner wall being inclined outwardly away from the perpendicular axis of the base of said plug portion, said inner wall portion of said socket member being adapted to mate with the inner wall portion of said plug member in demountable interfitted relationship in the side walls of the inclined portions of the inner wall of said socket member and having a diameter normally less than the diameter of the outer walls of the inclined portion of the inner wall of the plug member, whereby the shoulder portion of said plug member will be urged against the upper edge of the outside wall of said socket member.

2. A device according to claim 1 wherein said containers are covered by closures having a peripheral edge portion adapted to form a moisture tight seal with the peripheral flange of said containers.

3. A connecting coupling arrangement between two members fabricated of plastic materials comprising a socket portion on one of said members and a plug portion on the other of said members, said socket portion comprising an outer wall terminating in a peripheral edge, a base portion connected to the opposite edge of said outer wall, a continuous inner wall portion located centrally of said base portion, portions of said inner wall portion being inclined inwardly toward the perpendicular axis of said base, the upper edge of said continuous inner wall terminating below the plane defined by the upper edge of said outer wall, said inner wall having at least one elongated slot breaking the continuous upper edge surface and extending generally parallel to the perpendicular axis of said base portion; said plug portion having an outer wall with an outside diameter less than the inside diameter of the outer wall of said socket portion, and a height less than the height of said outer wall of said socket portion; a shoulder portion extending outwardly from the outer wall of said plug portion, a base portion connected to the outer wall of said plug portion adjacent said shoulder portion, a continuous inner wall portion located centrally of said base portion and having at least one elongate slot extending from the upper edge thereof to a point adjacent said base, portions of said inner wall being inclined outwardly away from the perpendicular axis of the base of said plug portion, said inner wall portion of said socket member being adapted to mate with the inner wall portion of said plug member in demountable interfitted relationship in the side walls of the inclined portions of the inner wall of said socket member having a diameter normally less than the diameter of the outer walls of the inclined portion of the inner wall of the plug member, whereby the shoulder portion of said plug member will be urged against the upper edge of the outside wall of said socket member.

4. A connecting coupling arrangement according to claim 3, wherein said inwardly inclined inner wall portion of said socket has a smoothly rounded bead adjacent the edge of said inner wall portion and said inclined wall portion of said plug member has a smoothly rounded bead on the outside adjacent the edge of said inner wall portion, the diameter of said outside bead being greater than the diameter of said inside bead whereby continuous pressure will be exerted on inclined surfaces of said beads when said plug and socket are forced together in interfitted demountable relationship.

References Cited

UNITED STATES PATENTS

| D. 183,690 | 10/1958 | Graham | D44—13 |
|---|---|---|---|
| 1,698,498 | 1/1929 | Bickford | 220—102 X |
| 3,146,906 | 9/1964 | Swett | 220—103 |
| 3,183,624 | 5/1965 | Swett | 150—0.5 X |
| 3,234,951 | 2/1966 | Schilling | 220—60 X |

FOREIGN PATENTS 523,566  4/1955  Italy.

GEORGE E. LOWRANCE, Primary Examiner

U.S. Cl. X.R.

150—0.5; D44—10